United States Patent [19]

Botz

[11] Patent Number: 5,425,884
[45] Date of Patent: Jun. 20, 1995

[54] RECOVERING POLYOXYALKYLENE GLYCOLS FROM WASTEWATER

[75] Inventor: Frank K. Botz, Port Neches, Tex.

[73] Assignee: Texaco Inc., White Plains, N.Y.

[21] Appl. No.: 231,001

[22] Filed: Apr. 21, 1994

[51] Int. Cl.6 .............................................. G02F 1/40
[52] U.S. Cl. .................................. 210/776; 210/767; 210/774; 210/690; 522/3
[58] Field of Search ............... 210/634, 767, 776, 774, 210/600, 670, 690, 691, 737, 742; 522/3, 80; 222/52

[56] References Cited

U.S. PATENT DOCUMENTS

| | | | |
|---|---|---|---|
| 3,823,145 | 7/1974 | Louvar et al. | 222/52 |
| 4,000,065 | 12/1976 | Ladha et al. | 212/652 |
| 4,647,598 | 3/1987 | Yada et al. | 522/3 |
| 4,897,199 | 1/1990 | Ananthapadmanabhan et al. | 210/691 |
| 5,200,083 | 4/1993 | Kaylor | 210/680 |

*Primary Examiner*—Robert A. Dawson
*Assistant Examiner*—Ana M. Fortuna
*Attorney, Agent, or Firm*—James L. Bailey; Kenneth R. Priem; Richard A. Morgan

[57] ABSTRACT

A method has been discovered for recovering polyoxyalkylene glycols from wastewater. A skimming surface is heated to a temperature above the cloud point. The heated surface is contacted with the wastewater, causing the polymer to deposit. Deposited polymer skimmed from the surface is recovered. Heating, or other processing of the bulk wastewater is avoided.

22 Claims, No Drawings

RECOVERING POLYOXYALKYLENE GLYCOLS FROM WASTEWATER

BACKGROUND OF THE INVENTION

1. Field Of The Invention

The invention relates to recovering polyoxyalkylene polymers from aqueous liquids. The invention is also a method of treating wastewater.

2. Description Of The Related Art

Polyoxyalkylene glycols are dissolved in water to produce aqueous fluids which demonstrate a number of advantageous physical and chemical properties. For many applications, the water solubility and lubricity of polyoxyalkylene glycols are the properties which determine the use of the fluid. In combination with water, the property described as inverse solubility enhances the lubricating property of the fluid. Inverse solubility refers to the property of certain polyoxyalkylene glycols to be soluble in water at lower temperatures and become insoluble, cloudy or unstable at some elevated temperature. This cloudiness or instability indicates phase separation from water which results in polyoxyalkylene glycol deposition on surfaces in contact with the fluid. The temperature at which instability and insolubility occurs is called the cloud point of the polyoxyalkylene glycol.

Friction in a machine results in the heating of lubricated surfaces. If the temperature of heated surfaces exceeds the cloud point, polyoxyalkylene glycol deposits on the surfaces, providing extra lubricity, reducing friction and wear. This deposition is desirable and is the mechanism by which some polyoxyalkylene glycols enhance lubricity.

Polyoxyalkylene glycols comprise epoxide monomers, most typically ethylene oxide, propylene oxide, butylene oxide and mixtures thereof. The polymerization is initiated with a compound having an active hydrogen such as an alcohol, glycol, glycerine, thioalcohol, or sugar. The initiator influences a number of the physical and chemical properties of the glycol. The physical properties of a polyoxyalkylene glycol are also a function of the monomer as well as, proportion and distribution of monomers and the molecular weight.

Not all polyoxyalkylene glycols are water-soluble, and not all those that are water-soluble exhibit a cloud point. Those which do exhibit a combination of lubricity, water solubility, and a cloud point are generally alcohol initiated and composed of a random mix of approximately equal amounts of ethylene oxide (EO) and propylene oxide (PO) along the polymer chain. They have cloud points between 40° C. and 70° C., and a molecular weight of 750 or greater. These polyoxyalkylene glycols exhibit the preferred combination of water solubility, lubricity, and inverse solubility. Some EO/PO block copolymers also have cloud points between 30° C. and 80° C., but they are more commonly used as surfactants rather than as functional fluid.

After a polyoxyalkylene glycol fluid is used for a period of time, it becomes reduced in effectiveness and contaminated. If the fluid is disposed of, disposal typically includes some method of separating the polyoxyalkylene glycol from water. Methods used to separate polyoxyalkylene glycol from water include chemical treatment, mechanical separation and filtration. Each unit operation requires handling and significant cost due to treatment chemicals, equipment, and heating.

It is known that polyoxyalkylene glycol can be separated from a spent aqueous fluid by heating the entire fluid to a temperature above the cloud point. The polyoxyalkylene glycol separates from the water and settles to the bottom of the fluid. There it is mechanically separated from the water. This method requires the energy to heat the entire fluid and the equipment to contain the quiescent fluid during precipitation.

There is a need in the art for an energy efficient method of recovering polyoxyalkylene glycols from water.

SUMMARY OF THE INVENTION

The invention is a method of recovering a polyoxyalkylene glycol from an aqueous liquid. The polyoxyalkylene glycol is characterized in monomers selected from the group consisting of ethylene oxide, propylene oxide, butylene oxide and mixtures thereof and demonstrating a cloud point in the range of 30° C. to 100° C. according to ASTM D-2024. American Society for Testing and Materials, Standard Test Method for Cloud Point of Nonionic Surfactants.

According to the method a skimming surface, substantially free of polyoxyalkylene glycol, is heated to a surface temperature above the cloud point. The aqueous liquid is contacted with the heated skimming surface, depositing polyoxyalkylene glycol thereon. The polyoxyalkylene glycol is removed from the skimming surface and recovered. The method is carried out in the absence of heating the aqueous liquid by direct heat exchange. The skimming surface is heated by direct heat exchange. The aqueous liquid is heated only by contact with the skimming surface.

The method is useful for recovering polyoxyalkylene glycols from spent functional fluids, such as lubricating fluids. The method is also useful as a method of treating wastewater prior to disposal.

DETAILED DESCRIPTION OF THE INVENTION

A skimming surface, such as a continuous conveyor belt is heated to a temperature above the cloud point and below the decomposition temperature of the polyoxyalkylene glycol. This heating may be carried out by any convenient method such as by means of an electric heater or fired heater. The heated conveyor belt is passed through the spent fluid. The polyoxyalkylene glycol adjacent the conveyor belt is heated to the cloud point and deposits on the conveyor. The conveyor belt is withdrawn from the aqueous liquid. Deposited polyoxyalkylene glycol is mechanically skimmed. The polymer free conveyor belt is returned to the aqueous fluid for reuse.

The lower temperature limit of the method is the cloud point of the fluid. The upper temperature limit is the flash point of the polyoxyalkylene glycol. This gives a typical operating range of 30° C. and 200° C. The skimming surface temperature may exceed the boiling point of the aqueous fluid. Should this be the case it is desirable to have a skimming surface residence time that does not transfer a significant amount of heat to the bulk fluid. Heat transfer to the bulk fluid is not required in the method, wastes heat, and is therefore undesirable. In fact a major benefit of the method is that there is no direct heating of the bulk fluid. Only indirect heat exchange by the bulk fluid by way of the skimming surface takes place.

The method is effective for any polyoxyalkylene glycol demonstrating a cloud point below the boiling point temperature of the aqueous liquid. Typical polyoxyalkylene glycols are alcohol initiated and comprise approximately equal molar quantities of ethylene (EO) and propylene oxide (PO) and which has a cloud point between 30° C. and 100° C. Typical EO:PO molar ratios range from 30:70 to 70:30. Included are polyoxyalkylene glycols comprising blocks of EO and PO. Such polyoxyalkylene glycols are more typically used for surfactants than as functional fluids.

The alcohol initiator used to make these polyoxyalkylene glycols is generally an aliphatic alcohol of 1 to 8 carbon atoms. Examples include methanol, ethanol, propanol, butanol and mixtures thereof. Also included as alcohol initiators are phenols of 6 to 14 carbon atoms. These include phenol itself and alkylphenols wherein the alkyl is a linear or branched chain of 1 to 12 carbon atoms. Examples include nonylphenol and dodecylphenol. Examples of sugar initiators include mannitol, sorbitol, erythritol, pentaerythritol, dimers, trimers and higher polymers thereof. These initiators are alkoxylated to produce the polyoxyalkylene glycols having molecular weights of 750 and greater. For example, molecular weights of 5000 and 10,000 are known. Molecular weights of 750 to 5000 are more typically used in functional fluids, such as lubricants.

The method may be carried out as a continuous process, for example by means of a continuous conveyor belt. In the Best Mode, the method is carried out by means of a continuous conveyor belt providing 1 to 2000 $cm^2$/mg polyoxyalkylene glycol/minute of residence time, preferably 10 to 1000, most preferably 10 to 50 $cm^2$/mg polyoxyalkylene/minute. The method may also be carried out in batch or semibatch. The materials of construction of the skimming surface are not critical. The material must be able to withstand heating and thermal cycling as well as abrasion. Examples of materials of construction include aluminum sheet, stainless steel sheet, galvanized steel sheet, rubber conveyor belting, rubber-synthetic fiber conveyor belting, leather belting, cotton canvas, synthetic fiber such as Dacron ® canvas and the like. Materials for means for skimming the surface are selected for compatibility with the skimming surface. Such materials include stiff rubbers, plastic such as polyethylene or polypropylene, and sponge such as are commercially available as squeegees, steel blades, wood blades and leather.

This invention is shown by way of Example.

EXAMPLE 1

TEXOX ® WL-5000 is a butanol-initiated polyoxyalkylene glycol composed of equal weights of randomly distributed ethylene oxide and propylene oxide. It is water-soluble with a viscosity of 5000 SUS @ 100° F., and a cloud point of 53° C. in 1% aqueous solution and 47° C. in 10% aqueous solution according to ASTM D-2024-65. The molecular weight is 4,365.

A 400 ml test fluid comprising 10% by weight TEXOX ® WL-5000 was prepared. The viscosity was measured as 1.43 cSt @ 40° C. The initial polyoxyalkylene glycol concentration was 9.5 wt % by Brix refractometer.

An aluminum panel having dimensions of 3 inch by 6 inch by 1/32 inch was used as a skimming surface. The panel was heated on an electric hot plate to 90° C. One half of the heated panel was dipped into the test solution for 10 seconds. Cloudiness was observed adjacent the panel. Most of the cloudy fluid remained in the test solution and much of the cloudy solution on the panel ran off as the panel was withdrawn from the test solution. The panel was weighed demonstrating that 1 $mg/cm^2$ polyoxyalkylene glycol adhered to the panel. The polyoxyalkylene glycol was skimmed from the panel. The concentration of the skimmed fluid was 12 to 15 wt % polyoxyalkylene glycol by Brix refractometer.

EXAMPLE 2

In order to improve effectiveness, the panel was heated to 150° C. and dipped in the same polyoxyalkylene glycol solution for 2 seconds. The cloudiness was thicker and denser than in Example 1. The higher panel temperature and shorter panel residence time improved the concentration of polyoxyalkylene glycol in the adhered fluid and the volume of removed fluid. The removal rate was 6 $mg/cm^2$ polyoxyalkylene glycol. The concentration of the skimmed glycol was 35 to 45 wt % by Brix refractometer.

While particular embodiments of the invention have been described, it will be understood, of course, that the invention is not limited thereto since many modifications may be made, and it is, therefore, contemplated to cover by the appended claims any such modification as fall within the true spirit and scope of the invention.

What is claimed is:

1. A method of recovering a polyoxyalkylene glycol from an aqueous liquid, wherein the polyoxyalkylene glycol is a monomer mixture ethylene oxide and propylene oxide in a molar ratio of 30:70 to 70:30, and demonstrating a cloud point in the range of 30° C. to 100° C., comprising the steps of:
   a. heating a skimming surface to a surface temperature above the cloud point,
   b. contacting the aqueous liquid with the heated skimming surface, thereby producing a deposited polymer thereon, and
   c. removing the deposited polymer from the skimming surface, thereby removing the polyoxyalkylene glycol from the aqueous liquid in the absence of heating the aqueous liquid by direct heat exchange.

2. The method of claim 1 wherein the polyoxyalkylene glycol is an alcohol initiated copolymer of ethylene oxide and propylene oxide in a molar ratio of 30:70 to 70:30 and wherein the polyoxyalkylene glycol has a molecular weight of 750 or more.

3. The method of claim 1 wherein the polyoxyalkylene glycol is an alcohol initiated copolymer of ethylene oxide and propylene oxide in a molar ratio of 30:70 to 70:30 and wherein the polyoxyalkylene glycol has a molecular weight of 750 to 5000.

4. The method of claim 1 wherein the surface temperature is 70° C. to 110° C.

5. The process of claim 1 wherein the aqueous liquid contains 0.1 wt % to 10 wt % polyoxyalkylene glycol.

6. The process of claim 1 wherein the aqueous liquid contains 0.5 wt % to 10 wt % polyoxyalkylene glycol.

7. The process of claim 1 wherein the aqueous liquid is wastewater.

8. A method of recovering a polyoxyalkylene glycol from an aqueous liquid, wherein the polyoxyalkylene glycol is a monomer mixture ethylene oxide and propylene oxide in a molar ratio of 30:70 to 70:30, and demonstrating a cloud point in the range of 30° C. to 100° C., comprising the steps of:

a. heating a skimming surface to a surface temperature above the cloud point,
b. contacting the heated skimming surface with the aqueous liquid, thereby producing a deposited polymer thereon, and
c. withdrawing the heated skimming surface from contact with the aqueous liquid, thereby removing the polyoxyalkylene glycol from the aqueous liquid in the absence of heating the aqueous liquid by direct heat exchange.

9. The method of claim 8 wherein the polyoxyalkylene glycol is an alcohol initiated copolymer of ethylene oxide and propylene oxide in a molar ratio of 30:70 to 70:30 and wherein the polyoxyalkylene glycol has a molecular weight of 750 or more.

10. The method of claim 8 wherein the polyoxyalkylene glycol is an alcohol initiated copolymer of ethylene oxide and propylene oxide in a molar ratio of 30:70 to 70:30 and wherein the polyoxyalkylene glycol has a molecular weight of 750 to 5000.

11. The method of claim 8 wherein the surface temperature is 70° C. to 110° C.

12. The process of claim 8 wherein the aqueous liquid contains 0.1 wt % to 10 wt % polyoxyalkylene glycol.

13. The process of claim 8 wherein the aqueous liquid is wastewater.

14. A continuous method of recovering a polyoxyalkylene glycol from an aqueous liquid, wherein the polyoxyalkylene glycol is a monomer mixture ethylene oxide and propylene oxide in a molar ratio of 30:70 to 70:30, and demonstrating a cloud point in the range of 30° C. to 100° C., comprising the steps of:
a. heating a skimming surface to a surface temperature above the cloud point,
b. contacting the aqueous heated skimming surface with the aqueous liquid, thereby producing a deposited polymer thereon, and withdrawing the heated surface from contact with the aqueous liquid at a rate providing a residence time of 1 to 2000 cm$^2$/mg polyoxyalkylene glycol/minute, and
c. removing the deposited polymer from the skimming surface, thereby removing the polyoxyalkylene glycol from the wastewater in the absence of heating the aqueous liquid by direct heat exchange.

15. The method of claim 14 wherein the polyoxyalkylene glycol is an alcohol initiated copolymer of ethylene oxide and propylene oxide in a molar ratio of 30:70 to 70:30 and wherein the polyoxyalkylene glycol has a molecular weight of 750 or more.

16. The method of claim 14 wherein the polyoxyalkylene glycol is an alcohol initiated copolymer of ethylene oxide and propylene oxide in a molar ratio of 30:70 to 70:30 and wherein the polyoxyalkylene glycol has a molecular weight of 750 to 5000.

17. The method of claim 14 wherein the surface temperature is 70° C. to 110° C.

18. The process of claim 14 wherein the aqueous liquid contains 0.1 wt % to 10 wt % polyoxyalkylene glycol.

19. The process of claim 14 wherein the aqueous liquid contains 0.5 wt % to 10 wt % polyoxyalkylene glycol.

20. The process of claim 14 wherein the aqueous liquid is wastewater.

21. The process of claim 14 wherein the residence time is 10 to 1000 cm$^2$/mg polyoxyalkylene glycol/minute.

22. The process of claim 14 wherein the residence time is 10 to 50 cm$^2$/mg polyoxyalkylene glycol/minute.

* * * * *